United States Patent [19]

Gable et al.

[11] 4,284,976
[45] Aug. 18, 1981

[54] INTERFACE BETWEEN COMMUNICATION CHANNEL SEGMENTS

[75] Inventors: Melvin G. Gable, Ypsilanti; Richard H. Sherman, Plymouth, both of Mich.

[73] Assignee: Ford Motor Company, Dearborn, Mich.

[21] Appl. No.: 46,576

[22] Filed: Jun. 7, 1979

[51] Int. Cl.³ .................. H04L 11/20; H04N 1/32; H04J 3/14; H04Q 9/00
[52] U.S. Cl. .................................... 340/147 R; 178/3
[58] Field of Search ..................... 340/147 R, 147 T; 178/3

[56] References Cited

U.S. PATENT DOCUMENTS

| | | | |
|---|---|---|---|
| 3,693,155 | 9/1972 | Crafton et al. | 340/147 T |
| 3,944,723 | 3/1976 | Fong | 340/147 T |
| 4,007,441 | 2/1977 | Faber | 340/147 R |
| 4,032,893 | 6/1977 | Moran | 340/147 T |
| 4,058,672 | 11/1977 | Crager et al. | 178/3 |

Primary Examiner—Donald J. Yusko
Attorney, Agent, or Firm—Peter Abolins; Clifford L. Sadler

[57] ABSTRACT

A plurality of transceivers frequently share a common communication medium or radio frequency channel. A broadcast channel can support only a limited number of transceivers. At some point, the shared channel will become so busy that additional transceivers will divide up more of an already inadequate bandwidth. To reduce the traffic, a broadcast channel is split into separate segments. A segment interface apparatus is used to couple two broadcast segments together. A hierarchical address is employed in the header of each packet transmitted on the medium. The segment interface apparatus compares fields in the header with that of internal registers to determine if the packet should be repeated on the other broadcast segment. An access level within the packet is decremented by the segment interface to control the number of times a packet is repeated.

15 Claims, 2 Drawing Figures

INTERFACE BETWEEN COMMUNICATION CHANNEL SEGMENTS

BACKGROUND OF THE INVENTION (1) Field of the Invention

The present invention relates to a multipoint data packet switching communication system and an apparatus for extending the communication coverage of a broadcast channel by means of coupling separate such channels together.

(2) Prior Art

Packet switching networks came into existence in response to the need for efficient and economical data communications. As networks grew, there has been a need for inexpensive, high-capacity communication channels. Satellite communication technology may offer a solution with its broadband channels. The satellite acts as a pure transponder repeating whatever it receives and beaming this transmission back down to earth. An alternative method of providing communications among a large number of data communication devices is through a ground radio packet switching system. Ground radio systems have been available for many years. The basic principles involved are similar to the satellite packet switching system. In both systems there is a broadcast channel which is shared among a number of distributed users.

To expand the signal coverage of a broadcast channel, more sophisticated transceivers or packet repeaters may be employed. There is a trade off between using such devices. Transceivers with increased power and sensitivity become more expensive and less reliable. The introduction of repeaters into a broadcast channel makes the interconnecting medium active. Hence, the failure of a repeater partitions the broadcast channel and degrades the communications.

A broadcast channel can support a limited number of transceiver devices. At some point the shared broadcast channel will be so busy that additional stations will just divide up more of an already inadequate bandwidth. To reduce the traffic, a broadcast channel may be split into separate segments. An unbuffered repeater with an address filter may be used to couple broadcast segments together. Such a device would pass packets from one broadcast segment to another only if the destination station is located on the new segment. Only one repeater can connect two separate broadcast segments together since a packet repeated multiple times on a segment by multiple repeaters would cause interference. Hence, a failure of a single repeater connecting two segments would partition the network.

The interconnection of broadcast segments could also be done with packet gateways and the software addressing convention they implement. A gateway approach for coupling point-to-point systems together is described by Cerf, V.G. and Kahn, R.E. in "A Protocol for Packet Network Intercommunication," IEEE Trans. Comm. May 1974, Pages 637-648. A gateway only repeats packets addressed to itself as an intermediary. Since gateways have packet buffers, a number of gateways may be used to connect two broadcast segments. Hence, a failure of a gateway need not partition the network if there are paths through other gateways between the segments.

An address is used to identify destination stations within a network. An address is a data structure whose format can be recognized by all elements in a system and defines the fundamental addressable object. An address must be meaningful throughout the total system and must be drawn from some uniform address space. This address space may be a "flat" one which spans the entire domain such as social security numbers or it may be a hierarchical address space such as telephone numbers with area codes. At the time a device wishes to communicate with a particular address, there will be some mechanism within the network which will map an address into an appropriate route.

In the case of broadcast transmission, which is on a local segment, all messages take the same route, so that only the address is needed to transmit the message. However, in the case of an intersegment message, a routing system is needed since each segment is connected to only a subset of the other segments. Therefore intersegment messages will take different routes to different designations.

The format of local and intersegment addresses in the packet header should be compatible so that a segment interface can recognize an intersegment packet from among those being broadcast locally. The segment interface which handles the packets at the destination segment should be able to use the local broadcast mechanism to send information to the destination station. The address mechanism should serve to transmit both local and intersegment packets. It should also be simple enough to be implemented in low cost dedicated hardware. This would avoid having to install complex routing algorithms or elaborate routing tables such as those implemented in conventional gateways. These are some of the problems this invention overcomes.

SUMMARY OF THE INVENTION

In accordance with an embodiment of this invention, a segment interface means processes a hierarchical address employed in the packet header of each transmission on the medium. The packet header includes a source address, a destination address and a control field. A route is a hierarchial address which contains intermediate segment interface addresses. If the destination address is a route, the segment interface means compares one of the fields in the hierarchical address with that stored in an address register within the interface. If the fields are identical, the interface can remove the field from the destination address and append it to the source address so that the route is correct. The interface then can enable the transceiver for transmission of the packet on the other broadcast segment. If the hierarchical address contains only the destination address of the station, the segment interface compares a second field in the packet header with that of another internal register. If this field does not match that held in the register, the segment interface can unconditionally transmit the packet on the other segment without altering the destination address. Multiple copies of a packet may be generated when more than one segment interface is used to connect two broadcast segments. An access level defining the maximum number of permissible retransmissions of the packet within the packet header control field can be decremented by the segment interface to control the number of times a packet is repeated.

BRIEF DESCRIPTION OF THE DRAWINGS

FIG. 1 illustrates the packet header format used in a segment interface in accordance with an embodiment of this invention wherein FIG. 1a is a destination addressed packet, FIG. 1b is a route addressed packet at the destination, and FIG. 1c is a route addressed packet at the source.

DETAILED DESCRIPTION

Figure 1:
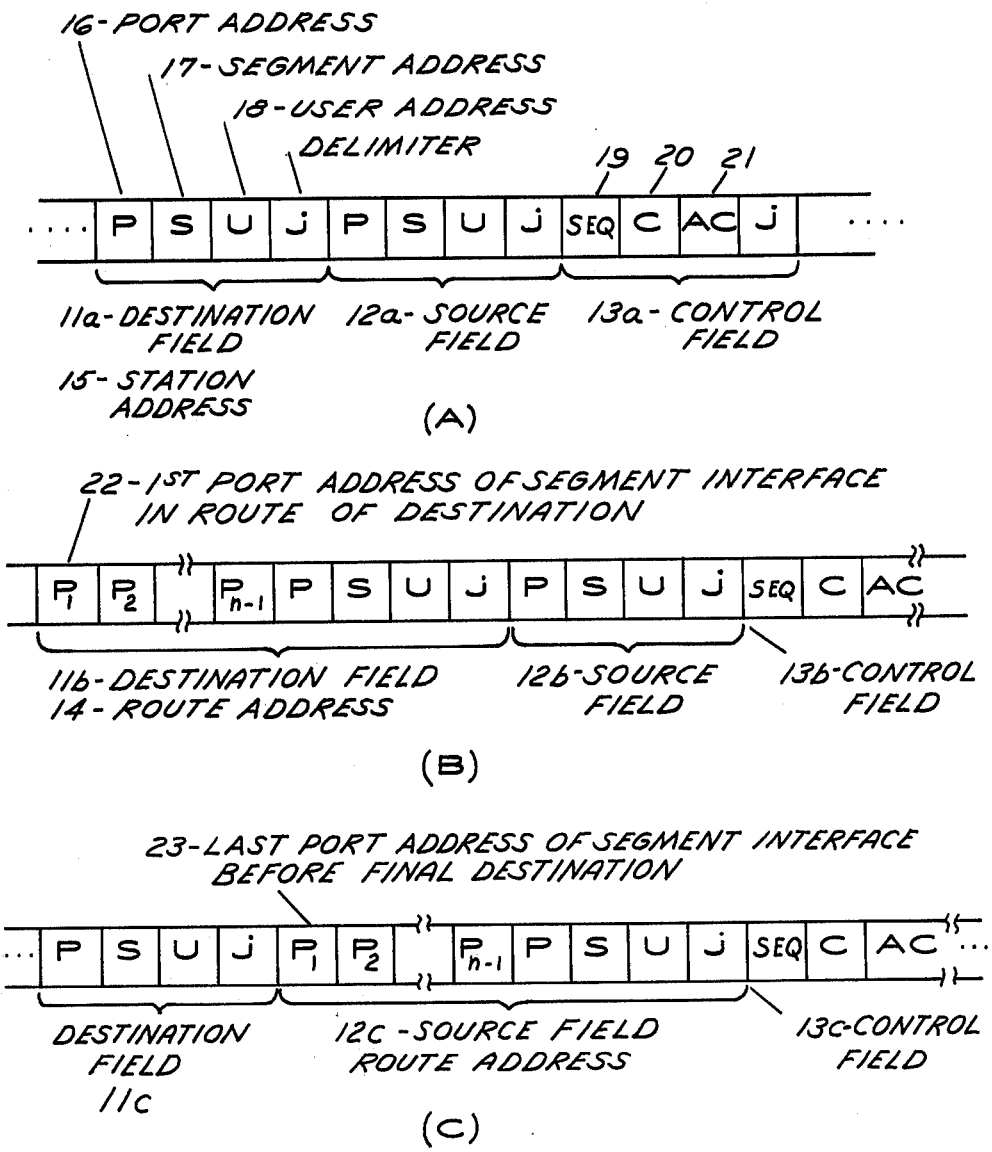

Referring to FIG. 1, in the embodiment described herein, each packet transmitted, whether on a local segment or between segments, has three fields: a destination field 11, a source field 12 and a control field 13. The destination field contains the address of an interface to interface route 14 or just a final destination station address 15. Each interface 30 (FIG. 2) is characterized by a port address denoting the connection of interface 30 to a communication channel segment. As discussed further below, each interface 30 also has stored address fields 38, 39, comparators 32, 33 for comparing received fields to stored fields and a controller 37 for governing transmission in response to the results of the comparison.

Referring to FIG. 1(a), in the case of a packet being broadcast on a local segment, a destination field 11a consists of three subfields, a port address 16 of the final destination station, a broadcast segment address 17 and a user or process address 18. The source field 12a is similar. The control field 13a contains a sequence number of the packet 19, a packet type identifier 20 and an access level field 21 which is used to determine the number of times a packet is to be repeated.

Referring to FIG. 1(b), the route address 14 appears in the destination field 11b of the packet header. The destination station address is prefixed with a port address field 22 of each segment interface on the route. Referring to FIG. 1(c), when a packet is received at the final destination, the destination field 11c will contain the three subfields 16, 17, 18 of the station address 15. Each segment interface that repeats a packet will generate a route address 14 by appending its interface port address 23 to a source field 12c, while the control field 13c remains the same as control fields 13a, 13b.

Figure 2:
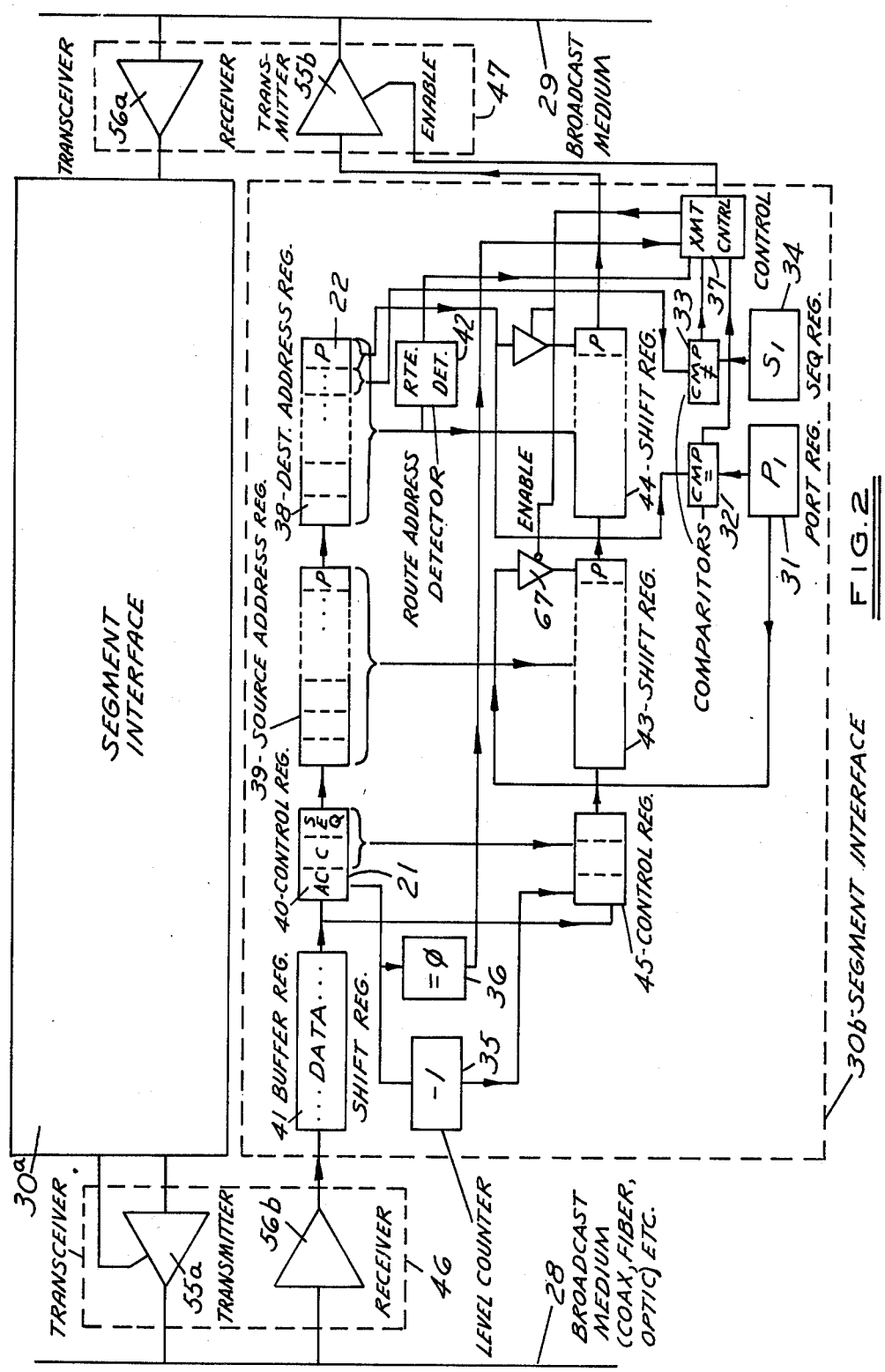
FIG. 2 is a block diagram representing the major functions within the segment interface.

Referring to FIG. 2, a segment interface 30a is coupled between a transceiver 46 and 47. Similarly, a segment interface 30b is coupled between transceiver 46 and 47. Each transceiver 46, 47 includes a transmitter 55 and a receiver 56. Transceiver 46 is coupled to a broadcast medium 28 and transceiver 47 is coupled to a broadcast medium 29. More particularly, segment interface 30a is coupled between receiver 56a and transmitter 55a, and segment interface 30b is coupled between receiver 56b and transmitter 55b. Each segment interface 30 has, coupled to receiver 56, the series combination of a buffer register 41, a control register 40, a source address register 39 and a destination address register 38. A level counter 35 and a zero detector 36 are coupled to control register 40. A control register 45 is coupled to control register 40, buffer register 41 and level counter 35. A shift register 43 is coupled to source address register 39 and control register 45. Route detector 42 is coupled to destination register 38 and a transmitter control 37 which in turn is coupled to the outputs of destination address register 38 and also to a port register 31 and a segment register 34 to provide outputs to transmitter control 37. Port register 31 also provides an output to shift register 43 through a logic control 67.

The port address 22 of each segment interface 30 is unique on its own broadcast segment 28. Hence, segment interface 30 can decide whether to accept a route addressed packet for transmission on its other segment 29 by comparing the first port address 22 in the destination field with that stored in its port register 31. If the fields are identical, comparator 32 enables a transceiver 47 for transmission of the packet on the other broadcast segment 29. Before the apparatus performs this comparison, a route detector 42 must first determine that the destination field was a route address 14. A route addressed packet is distinguished from a station address 15 by having a destination field 11 whose length is greater than the three fields, port 16, segment 17, and user 18. If it is a route address 14, the apparatus 30 will remove from the destination field 11 its port address 23 and append it to the source field 12. This will guarantee that the route address 14 is correct for transmission across the next segment.

If the destination field 11 is a station address 15, a comparator 33 within the segment interface 30 compares the segment address 17 in the destination field 11 with that stored in its segment register 34. If it does not match, the apparatus 30 will unconditionally transmit the packet on the other segment 29 without altering the destination field 11. It may however, append its own port interface address 23 to that in the source field 12. This process will then build a route address within the source field 12 which may be utilized by the final destination station. For example, the destination station may use the route address to send information back to the source station thereby informing the source station of the course taken by the information.

When multiple interfaces are employed in connecting two broadcast mediums together, interference may result unless transmission can be deferred. This deference is necessary so that each transceiver attempting transmission can obtain access to the shared medium. This type of operation requires that the segment interface 30 has sufficient buffers to store a packet transmission. The buffers 41, 40, 39, 38 are used to store the packet information received by transceiver 46. The segment interface 30 contains a destination address register 38, source address register 39, a control register 40 and a buffer 41 for storing the data within the packet.

A route detector 42 tests the length of the information stored in the destination address register 38. If the length is detected to be greater than three, the transmitter control circuit 37 transfers from register 38 all of the destination address except the first port address 22 to shift register 43. Otherwise, the destination address is not a route and register 38 is transferred into shift register 44. The transmitter control circuit 37 next loads the port address from register 31 as well as the contents from register 39 into shift register 43. If the access field 21 in control register 40 is determined not to be zero by detector 36, the control circuit 37 is enabled. The route detector 42 is coupled to control circuit 37 to determine which comparator 32, 33 output is to be used to enable transceiver 47. If the appropriate comparator enables transmission by control circuit 37, the buffer contents in registers 44, 43, 42 and 41 are transmitted on broadcast medium 29.

A number of segment interfaces may be used to connect two broadcast segments 28, 29 together. Hence, multiple copies of a packet may be transmitted on a broadcast segment. In order to prevent these multiple copies from flooding the network, the packet header contains an access level field 21. Each time a segment interface 30 transmits a packet, the value of this level field 21 is decremented by one by the level counter 35.

When the access level is less than one, the zero detector 36 inhibits the segment interface 30 from transmitting the packet to its other broadcast segment 29. Thus, each copy of a packet will either eventually reach the destination or cease to be repeated.

A data communication system suitable for use with this invention is further described in a copending application entitled "Communication Broadcast Channel Interface" (Ser. No. 46,578 filed on June 7, 1979) filed on even date herewith, assigned to the assignee of this application, the disclosure of which is hereby incorporated by reference.

Various modifications and variations will no doubt occur to those skilled in the various arts to which this invention pertains. For example, the particular sequence of processing a packet address may be varied from that disclosed herein. These and all other variations which basically rely on the teachings through which this disclosure has advanced the art are properly considered within the scope of this invention.

We claim:

1. A communication system having a broadcast medium shared by a plurality of transceivers which are transmitting and receiving communication packets, said broadcast medium including a first communication channel segment and a second communication channel segment, the communication system having an interface means for passing communication packets having a hierarchical address in a packet header, which hierarchical address has at least two levels and includes identification of the final destination of the communication packet, from said first communication channel segment to said second communication channel segment of said broadcast medium, each of the first and second communication channel segments having at least two transceivers, said interface means including:
   a first address register means for storing a first register field for comparison with a first packet field in the hierarchical address of the communication packet header and for transmitting the communication packet to the second communication channel segment if said first register and packet field do not match.

2. An interface means as recited in claim 1 further comprising:
   a second address register means for storing a second register field for providing information to append to the hierarchical address so that a source field portion of the packet header designating the source of the communication packet, is altered by the addition of said second register field.

3. An interface means as recited in claim 1 further comprising a decrementing means for decrementing a portion of the packet header including an access level for determining the number of retransmissions of the communication packet so as to control the number of times a packet is repeated and the packet either reaches its destination or ceases to be repeated.

4. An interface means as recited in claim 3 further comprising a zero detector means coupled to said decrementing means for detecting a zero in the access level and inhibiting transmission in response to a detected zero.

5. An interface means as recited in claim 1 further comprising:
   a buffer means for storing a packet transmission so that said interface means can defer transmission to said second communication channel segment until access can be gained to said second communication channel segment.

6. A communication system having a broadcast medium shared by a plurality of transceivers which are transmitting and receiving communication packets, said broadcast medium including a first communication channel segment and a second communication channel segment, the communication system having an interface means for passing communication packets having a hierarchical address in a packet header, which hierarchical address has at least two levels and can contain a route address having intermediate segment interface addresses and identification of the final destination of the communication packet, from a first communication channel segment of a broadcast medium shared by a plurality of transceivers which are transmitting and receiving the communication packets, to a second communication channel segment of said broadcast medium, each of the first and second communication channel segments having at least two transceivers, said interface means including:
   a first address register means for storing a first register field for comparison with a first packet field in the hierarchical address of the communication packet header and for transmitting the communication packet to the second communication channel segmet if said first register and packet fields do not match,
   a route detector means for testing the hierarchical address to determine the presence of a route address;
   a first address register means for storing a first register field for comparison with a first packet field in the hierarchical address of the communication packet header;
   a comparison means for comparing said first register field with said first packet field in the hierarchical address if the route detector means indicates the presence of a route address in the hierarchical address; and
   a retransmission means for transmitting the communication packet on the second communication channel segment if said first register field and first packet field are identical.

7. An interface means as recited in claim 6 further comprising:
   a removal means for removing said first packet field from the hierarchical address if the packet is to be retransmitted.

8. An interface means as recited in claim 6 wherein said first address register includes means for providing information to append to the hierarchical address so that a source field portion of the hierarchical address, designating the source of the communication packet, is altered by the addition of said first register field.

9. An interface means as recited in claim 6 further comprising:
   a buffer means for storing a packet transmission so that said interface means can defer transmission to said second communication channel segment until access can be gained to said second communication channel segment.

10. An interface means as recited in claim 6 further comprising:
    a second address register field for storing a second register field for comparison, when said route detector does not indicate the presence of a route address, with a second packet field in the hierarchical address of the communication packet header and for transmitting the communication packet to the second communication channel segment if said second register and said second packet fields do not match.

11. An interface means as recited in claim 10 wherein said first address register includes means for providing information to append to the hierarchical address so that a source field portion of the hierarchical address, designating the source of the communication packet, is altered by the addition of said first register field.

12. An interface means as recited in claim 10 further comprising:
a buffer means for storing a packet transmission so that said interface means can defer transmission to said second communication channel segment until access can be gained to said second communication channel segment.

13. An interface means as recited in claim 10 further comprising a decrementing means for decrementing a portion of the packet header including an access level for determining the number of retransmissions of the communication packet so as to control the number of times a packet is repeated and the packet either reaches its destination or ceases to be repeated.

14. An interface means as recited in claim 13 further comprising a zero detector means coupled to said decrementing means for detecting a zero in the access level and inhibiting transmission in response to a detected zero.

15. An interface means for passing communication packets having a hierarchical address in a packet header from a first communication channel segment, of a broadcast medium shared by a plurality of transceivers which are transmitting and receiving the communication packets, to a second communication channel segment of said broadcast medium, a receiver being coupled between said interface means and said first communication channel segment, a transmitter being coupled between said interface means and said second communication channel segment, said interface means including:
a buffer register means coupled to said receiver for storing packet data;
a first control register means coupled to said buffer register means for storing control information;
a first source address register means coupled to said first control register means for storing a hierarchical source address;
a first destination address register means coupled to said first source address register means for storing a hierarchical destination address;
a level counter means coupled to said first control register means for determining and decrementing an access level characterized by the packet and therefore the retransmission of the communication packet;
a zero detector means coupled to said first control register means for detecting zero in the retransmission access level of the communication packet and generating an inhibit output for preventing retransmission;
a first and a second storage register means for storing information characteristics of the interface means;
a first comparator means coupled to said first storage register means and said first destination address register means for comparing a first and a second portion of the register information and generating a first output when said first portion and said second portion of register information is identical;
a second comparator means coupled to said second storage register means, said second storage register means and said first destination address register means for comparing a third and a fourth portion of the register information and generating a second output when said third and said fourth portion of register information is not identical;
a route detector means coupled to said first destination address register means for determining if the hierarchical address stored in said destination address register means is a route address and generating an output when a route address is detected;
a transmitter control means coupled to said zero detector means for receiving said inhibit output, coupled to said route detector means; and coupled to said first and second comparator means for selecting the output of either said first or second comparator means in response to information from said route detector means;
a second control register means coupled to said first control register means and said level counter means for storing a portion of said first control register means and for storing the output of said level counter means;
a second source address register means coupled to said first source address register and said first storage register means for storing the contents of the two coupled registers;
a second destination register coupled to said first destination address register means for receiving either a portion of the hierarchical address or the total contents of the hierarchical address as described by said transmitter control means; and
said transmitter control means being adapted to control transmission of the contents of said buffer register means, said second control register, said second source address register and said second destination address register, thereby enabling the transmitter.

* * * * *